United States Patent Office 2,950,618
Patented Aug. 30, 1960

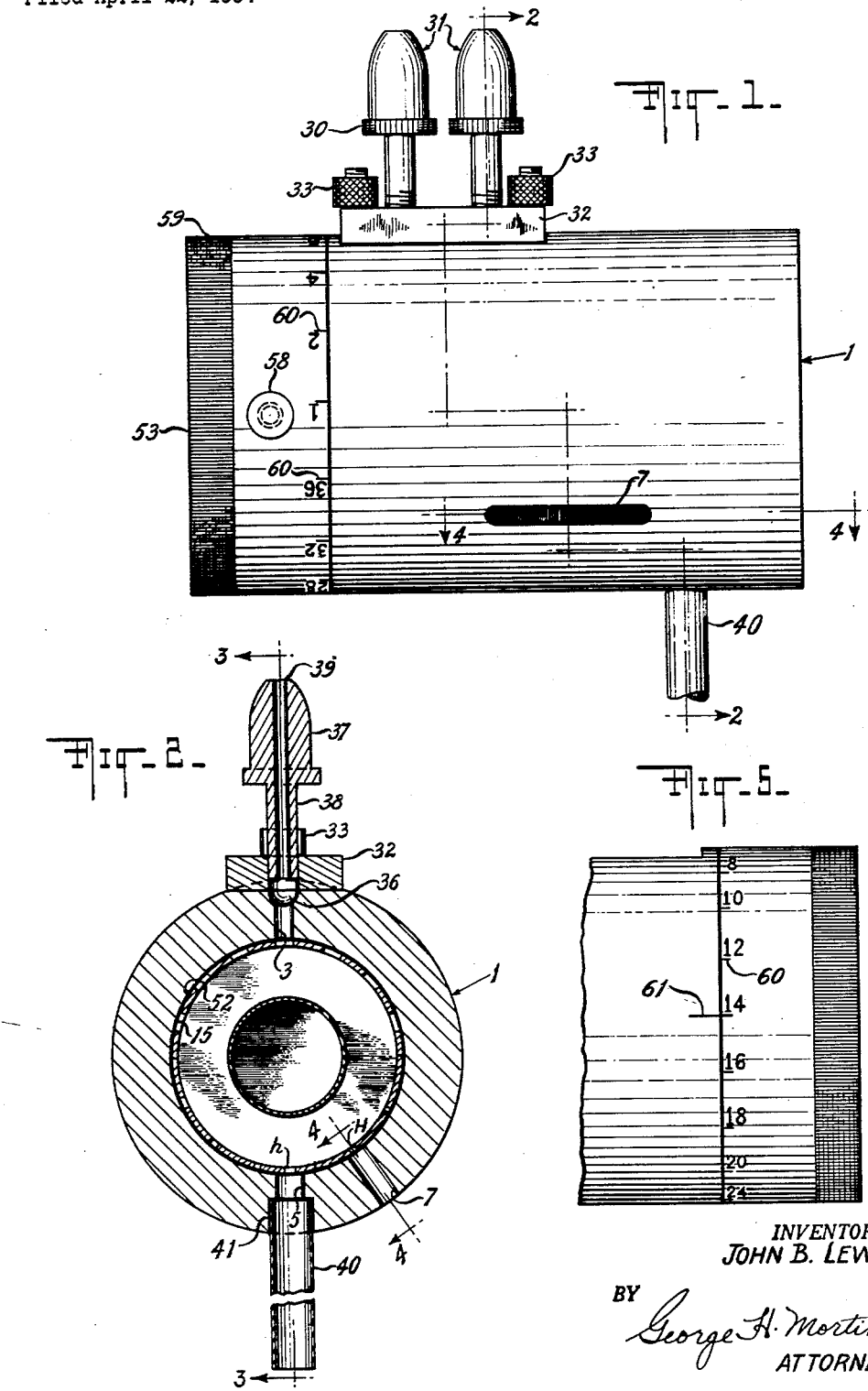

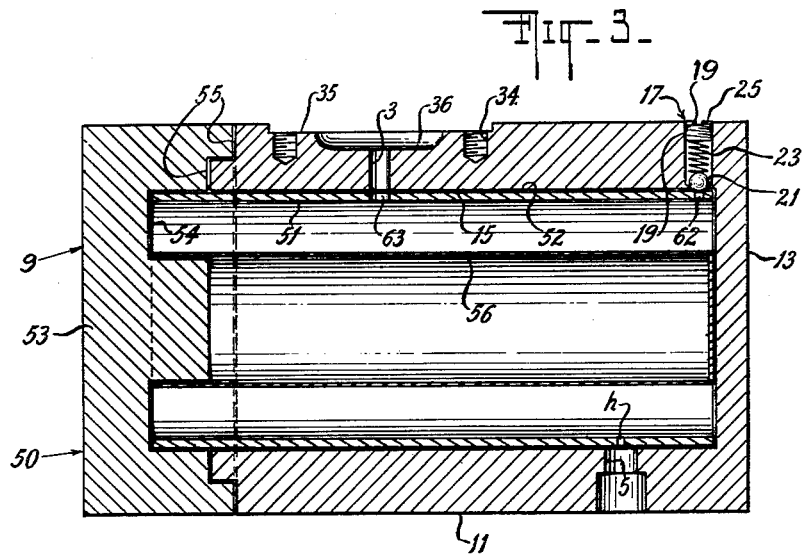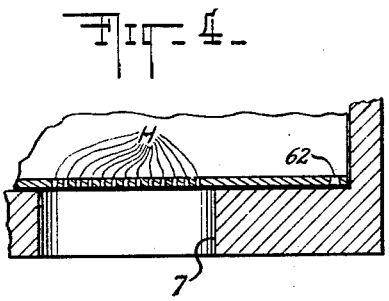

2,950,618

DEVICE FOR BLENDING GASEOUS MATERIALS

John B. Lewis, P.O. Box 349, Mendham, N.J.

Filed Apr. 22, 1954, Ser. No. 424,914

15 Claims. (Cl. 73—23)

The present invention relates to a device for blending gaseous materials from a plurality of sources in predetermined ratios, preferably linear, and more particularly to a device for the quantitative evaluation of the amount of odor in an odorous atmosphere.

In U.S. Patent No. 2,136,844 a device is disclosed for measuring odor by dilution of an odorous atmosphere with a diluent atmosphere in geometric ratio. In the use of this instrument, readings were recorded in $p0$ values which were logarithms to the base 2 of the ratio of the volume of the mixed diluted atmosphere to the volume of odorous atmosphere in the mixture. This method of recording data made it improper to average the results from a plurality of observations, whether made by the same observer or not, for the purpose of statistical analysis. Moreover, the device possessed certain inherent defects which rendered it inaccurate, such as leakage of air into the device through joints therein and the necessarily large size which made the volume of atmosphere in the instrument greater than a single inhalation. The size and shape of the device made it cumbersome to use, particularly if the operator was required to hold it while making an observation.

In accordance with the present invention a device is provided which preferably blends atmospheres in linear ratio, thus permitting statistical analysis to be made directly from the data recorded, and which has structural features that overcome the defects of the prior devices. The instrument of the invention is easy to use, easy to clean and is dependable. The objects, features and structure of the device will become clear from the following description of the best known embodiment of the principle of the invention, taken in conjunction with the drawings in which:

Fig. 1 is a view of the device in side elevation;

Fig. 2 is a sectional view along the line 2—2 of Fig. 1;

Fig. 3 is a sectional view along the line 3—3 of Fig. 2 with some parts omitted;

Fig. 4 is a fragmentary sectional view along the line 4—4 of Fig. 2;

Fig. 5 is a fragmentary elevation of the device as seen from the side opposite to Fig. 1; and Fig. 6 is a developed view of the inner cylinder and the sets of openings therein.

Referring now to the drawings, the device comprises a mixing or blending chamber 1 having an outlet 3, an inlet 5 for an odorous atmosphere and an inlet 7 for a diluent atmosphere. Means referred to generally by reference number 9 are provided for varying selectively the ratio of the area of one of the inlets linearly to the sum of the areas of both inlets. In its preferred form, the areas of the inlets are varied by interposing means provided with apertures and these apertures for any particular setting have the same size and shape so that the ratio can always be expressed as the number of such apertures in the inlet for odorous atmosphere to the total number of such apertures in both the inlet for odorous and the inlet for diluent atmosphere.

The chamber 1 is preferably constructed in the form of a pair of interfitting relatively rotatable cups, the outer one which may be termed a shell 11 being open at one end, closed by a wall 13 at the other end and having a cylindrical inner wall 15 perforated by the three openings, 3, 5 and 7 previously mentioned. A latch mechanism 17 is also mounted in the shell in a threaded opening 19 in which are housed a ball 21 capable of projecting partially into the chamber 1, a spring 23 biasing the ball 21 inwardly and a screw 25 threaded into the opening 19 to hold the parts in place therein.

Atmospheres are drawn into the mixing chamber 1 by suction applied through outlet 3. In its preferred form as an odor meter, means 30 are provided for applying the suction through the nose of the observer and simultaneously directing the streams of mixed atmospheres onto the olfactory areas of the nose. The means 30 comprises two nosepieces 31 mounted in a base 32 secured to the shell 11 by bolts 33 threaded into openings 34 in a flattened area 35 surrounding outlet 3. The lower surface of the base 32 and the flattened area 35 are planar so that a joint is formed which is air-tight at the pressures involved in the used of the device when the bolts 33 are screwed down tightly. Cooperating grooves in the shell and base provide a channel 36 connecting the two nosepieces 31 with the single opening 3. Each nosepiece 31 comprises an enlarged end portion 37 adapted tightly to engage the wall of the nostril and form an air-tight contact therewith, at the pressures involved in use of the instrument, and a stem portion 38 threaded into or frictionally held in the base 32. One or both of the stems 38 may be bent, if desired, so that by turning a bent stem the spacing between the nosepieces can be adapted to the requirements of individual users of the device. A channel 39 extends throughout the nosepiece 31, as seen in Fig. 2.

Any suitable means may be used to connect the openings or inlets 5 and 7 with the source of odorous atmosphere and diluent atmosphere, respectively. For use as an odor meter for measuring the odor of the mouth, the under arm, the feet and the like, a simple tube 40 having a friction fit in an enlargement 41 of the inlet opening 5 serves quite satisfactorily provided the volume thereof is kept well below the volume of a single inhalation of the observer. Generally speaking the diluent atmosphere used is atmospheric air so that no means for connecting the opening 7 to this source is required. In the event, however, that a closed source of diluent atmosphere other than the atmospheric air is to be used, any suitable tubular connection may be provided and there is no limit on its capacity but the pressure on the source of diluent atmosphere and on the source of the odorous atmosphere should be as near the same as possible to assure the proper volumetric ratio of atmospheres being drawn into the mixing chamber.

The inner cup 50 comprises a hollow inner member 51 having an outer cylindrical wall 52 closely fitting the inner cylindrical wall 15 of the shell 11 with which it is substantially coextensive so as to form a practically air-tight joint between them while still allowing relative rotation about their common axis. The inner cylinder 51 is mounted on an end piece 53 preferably of circular section having the same radius as the shell 11. A convenient method of mounting is to provide an annular groove 54 on the inner surface of the end piece 53 into which an end of the inner cylinder fits snugly. In order to eliminate the possibility of air leakage through the joint between the end piece 53 and the shell 11, the contacting surfaces may be provided with interfitting rabbets 55 as shown in Fig. 3. A closed cylinder 56 is preferably provided within the inner cylinder 51 for reducing the volume of the mixing chamber, being conveniently mounted on the inner wall of the annular groove 54 as shown in Fig. 3 by a snug friction fit. Preferably the inner cylinder is provided with a hole 57 for passage of a machine screw 58 which holds the inner cylinder in place on the end piece 53. The end piece 53 is preferably provided with knurling 59 to make rotation easier and with a series of scale marks 60 which can be aligned selectively with an index mark 61 on shell 11 for a purpose later to be described. The inner cup is held removably within the outer cup by means of the latching mechanism and a series of openings 62 in the inner cylinder into which the ball 21 is adapted to seat, as seen in Fig. 3. These openings 62, moreover, are so located that when the ball 21 seats in any hole, one of the scale marks 60 will be aligned with the index mark 61. The inner cylinder is also provided with a series of openings 63, preferably of the same diameter as the outlet 3 and they are so arranged with reference to openings 62 that one of the openings 63 is aligned with the outlet 3 when ball 21 seats in an opening 62.

The inner cylinder 51 is also provided with two series of openings, a capital letter series designated B to P inclusive, and a small letter series designated a to p inclusive. The unperforated area marked A is located in the line of the capital letter series openings and it corresponds to an opening of zero area for a purpose to be described. The openings in the capital letter series are so related in position with respect to the openings in the small letter series and to the openings 62 that when ball 21 is seated in an opening 62 the openings H, for example, are registered with opening 7 while the opening h is registered with opening 5, as indicated by the dotted lines in Fig. 6 and the sectional views Figs. 3 and 4. Relative rotation of the interfitting cups will likewise bring into registry with holes 7 and 5, respectively, openings B and b, C and c, etc., as well as area A and hole a. The holes designated by the same letter, e.g., B and b, K and k, etc., will sometimes be referred to as a set, and since A and a represent one limit of the series, it will also be considered as a set of holes.

The holes of any set bear a definite area relationship to each other and, except for the limiting set A—a, all the holes in any set preferably have the same size and shape, e.g., circular holes of the same diameter. Starting with set A—a, the hole a is preferably slightly larger in area than hole 63 so that odorous atmosphere will flow through the inlet into the mixing chamber without metering effect when suction is applied to the outlet 3, and for the same reason the diameter of inlet 5 is larger than the diameter of outlet 3. Similarly the sum of the areas B—b, H—h, P—p, etc., is always greater than the area of the outlet. Because of this relationship the outlet from the mixing chamber serves to meter the flow through the instrument rather than the inlet openings. This arrangement assures more accurate proportioning of the atmospheres than obtains when the area of the inlets is equal to or smaller than the area of the outlet. When A—a, are aligned with the inlets 7 and 5, respectively, and suction is applied to outlet 3, the odorous atmosphere is drawn undiluted from the source through the mixing chamber and into the outlet and nosepiece 30 as soon as the air in the device is displaced. This gives a ratio of odorous atmosphere to total atmosphere of 1:1, and this setting brings scale mark 1 opposite index mark 61. When B—b are aligned with the inlets, equal volumes of odorous atmosphere and diluent atmosphere are blended in the mixing chamber when suction is applied, which gives a ratio of odorous atmosphere to total atmosphere of 1:2 and the setting of the cups in this position brings scale mark 2 opposite the index mark 61. Since there are three holes in C of the same diameter as the single hole c, the blend of atmospheres obtained when this set of holes registers with inlets 7 and 5 has a ratio of odorous atmosphere to total atmosphere of 1:4 and this setting of the cups brings scale mark 4 opposite index mark 61. In a similar manner the sets of holes D—d through P—p gives ratios of odorous atmosphere to total atmosphere corresponding to the scale mark in Fig. 6 on the same horizontal line as the holes of the capital letter series. It is important to observe that the inner cylinder provides means for varying the area of the inlets to produce a linear dilution ratio as opposed to a geometric dilution ratio. This makes it possible to average readings made by an observer directly from recorded data taken from the scale marks and obtain results which can be subjected to statistical analysis and be meaningful.

The series of holes 63 serves to meter the flow of the atmospheres through the instrument so that the flow will be substantially the same at all dilutions. Specifically the area of these metering holes is preferably not less than 40% nor more than 85% of the combined areas of the two inlets forming the set of holes at any given dilution. This means that the intake capacity is always greater than that of the metering capacity under the negative pressure encountered in the normal operation of the instrument.

The holes in the sets A—a, B—b, etc., to P—p vary in size and number in such a way that the volume of air or atmosphere which can be drawn through them is ample regardless of the number of holes or the size of the holes. More specifically, the arrangement of these holes and their size preferably is such that as the dilution factor decreases, the area of the holes increases in steps, each step in hole size advantageously giving approximately double the area of the previous size of hole. Other factors than doubling can be used, if desired.

For the purpose of illustrating, but not limiting, an inner cup embodying the invention the following schedule of satisfactory hole sizes is given, all being made with standard drills of English dimensions (fractions of an inch):

| Olents read | Drill size | Area in square inches | | | | | Percent Meter passes [1] |
|---|---|---|---|---|---|---|---|
| | | Hole | Odorous | Holes | Diluent | Total | |
| 1 | 3/16 | a | .0276 | A | zero | .0276 | 70 |
| 2 | 1/8 | b | .0123 | B | .0123 | .0246 | 78 |
| 4 | 3/32 | c | .0069 | C | .0207 | .0273 | 70 |
| 6 | 3/32 | d | .0069 | D | .0345 | .0414 | 46 |
| 8 | 1/16 | e | .0031 | E | .0217 | .0248 | 78 |
| 10 | 1/16 | f | .0031 | F | .0279 | .0310 | 62 |
| 12 | 1/16 | g | .0031 | G | .0341 | .0372 | 51 |
| 14 | 3/64 | h | .0017 | H | .0221 | .0238 | 80 |
| 16 | 3/64 | i | .0017 | I | .0255 | .0272 | 70 |
| 18 | 3/64 | j | .0017 | J | .0289 | .0306 | 64 |
| 20 | 3/64 | k | .0017 | K | .0323 | .0340 | 67 |
| 24 | 3/64 | l | .0017 | L | .0391 | .0408 | 47 |
| 28 | 1/32 | m | .0008 | M | .0216 | .0224 | 85 |
| 32 | 1/32 | n | .0008 | N | .0248 | .0256 | 75 |
| 36 | 1/32 | p | .0008 | P | .280 | .0288 | 66 |

[1] Percent Meter passes = $\frac{\text{Outlet area} \times 100}{\text{Total inlet area}}$ (outlet hole = 5/32″).

Instead of using drills of English dimensions, drills of metric dimensions may be used, if desired.

The instrument utilizing the hole sizes of the foregoing schedule has a mixing chamber 3½ inches long, 2 inches in diameter with a sleeve 56 having an outer diameter of 1 inch. Tube 40 has an internal diameter of 0.43 inch. The inner shell has a wall thickness of 0.045 inch. The parts are made of aluminum specially treated, as hereinafter described, to eliminate porosity, aluminum odor and to provide odorless lubrication.

The treatment of the metal, in the case of aluminum, comprises anodizing electrolytically to produce a hard durable coating which is part of the metal itself and not an electroplating, spraying the anodized surface with a mixture of graphite and finely divided molybdenum sulfide and then heat treating at a suitable temperature. The same type of finish can be applied to other metals and it is within the contemplation of the invention to fabricate the device out of any suitable metals, alloys or combinations thereof. As the coating occupies space, the tolerances of the metal are set at a clearance of not less than about 0.005 inch nor more than about 0.010 inch prior to applications of the coating. In the illustrative embodiment given above, the inner cylinder was finished to a clearance of 0.006 inch by hand lapping and then coated, which gave a finished clearance of 0.001 inch. This method of finishing avoids pockets or porous surfaces where odor bodies could collect and it provides odorless lubrication without liquid or paste lubrication which, if present, would impair the accuracy of the instrument due to inherent or adsorbed odors. The accuracy depends upon the absence of odorous material except from the in-flowing odorous atmosphere such as residual odors from previous observations, cleaning fluids, lubricants and the like. The instrument specifically described satisfies these requirements admirably since it has no porous surfaces where odor bodies can cling, no odorous lubricants and it can be cleaned satisfactorily in most cases merely by flowing odorless atmosphere through it to flush out the atmosphere from a previous use.

The instrument is used by inserting the intake tube 40 into the odorous atmosphere with the dial set at a reading of 36, the maximum dilution for this particular embodiment, although it will be obvious that provision for higher dilutions can easily made, if desired, by merely extending the series of openings in the capital and small letter series or sets. The nosepieces are inserted in the nostrils of an observer and an inhalation made. The observer either smells an odor or fails to detect an odor. If no odor is detected, the end piece or dial is turned to the next setting 32 and another inhalation made. If an odor is perceptible to the observer at this setting of the instrument, this number 32 is recorded as the indication of an atmosphere, which when diluted 32 times, gives one olent or one unit of smell. If no odor is detected, the process is repeated at setting 28, 24, 20, 18, etc., until the odor is first perceived, i.e., until the instrument reaches a setting representing one olent. As an olent is the smallest amount of odor which can be detected by the human nose, specifically by the nose of the observer operating the instrument, no smaller reading can be made and at any higher dilution the atmosphere is said to be odorless. The instrument is then cleaned for the next use by flowing an odorless atmosphere through it.

While the holes have all been shown in the cylindrical surface of the inner cylinder 51, it will be apparent that this is not essential and that the same result could be obtained, for example, by providing an end wall on the inner cylinder and putting some of the holes in the end wall to align with an opening in the end wall 13 if the holes selected to be in the end wall correspond to holes 63, or series *a* to *p*. It is likewise within the contemplation of the invention to provide dual outlets for the nosepiece of half the area of the metering hole shown in the drawings. Other modifications and variations in structure and arrangements of the parts and the materials of which they are made, as those skilled in the art will appreciate, without departing from the principle of the invention or from the scope thereof defined in the following claims.

Having thus described and illustrated the invention and its manner of use, what I claim as my invention is:

1. A device for blending atmospheres from two sources comprising a pair of interfitting relatively rotatable hollow members closed at opposite ends forming a blending chamber of fixed volume and having substantially coextensive opposed cylindrical surfaces with a practically air tight joint between them, means forming an outlet for withdrawing blended atmospheres from said chamber, means forming two inlets for said chamber adapted to communicate respectively with said two atmosphere sources and means operable by relative rotation of said members for varying the area of one of said inlets linearly with respect to the sum of the areas of said inlets.

2. A device for the quantitative evaluation of the amount of odor in an odorous atmosphere comprising a pair of interfitting relatively rotatable hollow members closed at opposite ends forming a mixing chamber of fixed volume and having substantially coextensive opposed cylindrical surfaces with a practically air tight clearance between them of not more than about 0.01 inch, means adapted to connect said chamber to a source of said odorous atmosphere, means adapted to connect said chamber to a source of odorless diluting atmosphere, means for directing a mixture of said atmospheres from said chamber into the nostrils of an observer and means including selectively registerable openings of varying area ratios in said members through which said connecting means communicate with said chamber for producing in said chamber by relative rotation of said members a dilution of the odorous atmosphere with odorless atmosphere in accordance with a predetermined ratio.

3. A device for blending atmospheres in predetermined ratios comprising a pair of interfitted relatively rotatable hollow members closed at opposite ends forming a blending chamber of fixed volume and having substantially coextensive opposed cylindrical surfaces with such small clearance as to form a practically air tight joint, a metering outlet for said chamber, an inlet of variable area for odorous atmosphere, an inlet of variable area for diluting atmosphere and means for varying the areas of said inlets in accordance with a predetermined ratio by rotating said members relative to each other, the area of said outlet always being smaller than the sum of the areas of said inlets.

4. A device for blending atmospheres in predetermined ratios by volume comprising a pair of interfitting relatively rotatable substantially coextensive cylindrical cups closed at opposite ends forming a mixing chamber, means including registering openings in the cylindrical walls of said cups forming respectively a suction outlet for said chamber, an inlet for an odorous atmosphere and an inlet for diluent atmosphere, and means operable by relative rotation of said cups for varying the area ratio of said inlets while maintaining the volume of said chamber constant.

5. A device as set forth in claim 4 in which the area of said suction outlet is smaller than the combined areas of said inlets.

6. A device for blending atmospheres in predetermined volume ratios comprising a pair of interfitting relatively rotatable substantially coextensive cylindrical cups closed at opposite ends forming a mixing chamber of fixed volume, means including registering openings in the cylindrical walls of said cups forming respectively a suction outlet for said chamber, an inlet for odorous atmosphere and an inlet for diluent atmosphere, the latter comprising a series of sets of openings in one of said cups, each set of openings bearing a predetermined area ratio to said inlet for odorous atmosphere different from every other set, and means on said other cup for exposing only one set of openings at a time.

7. A device for blending atmospheres in predetermined volume ratios comprising a pair of interfitting relatively rotatable substantially coextensive cylindrical cups closed at opposite ends forming a mixing chamber of fixed volume, a suction outlet for said chamber, an inlet opening of fixed area for odorous atmosphere and an inlet opening of fixed area for diluent atmosphere in the cylindrical wall of one of said cups, a series of inlet openings of varying area for odorous atmosphere and a series of sets of inlet openings of varying area for diluent atmosphere in the cylindrical wall of the other of said cups adapted respectively to register with said inlet openings of fixed area and leave uncovered inlet openings of said other cup which bear a predetermined area ratio to each other.

8. A device for the quantitative evaluation of the amount of odor in an odorous atmosphere comprising an outer shell having a cylindrical inner wall and one end wall, said shell being provided with axially offset orifices for admission of odorous atmosphere and odorless diluent atmosphere and for withdrawal of mixed atmospheres; a hollow inner member having an outer cylindrical wall closely fitting within said outer shell and rotatable therein about their common axis; an end wall secured to said inner member forming a substantially air-tight joint with said outer shell; said inner member, shell and end walls forming a mixing chamber of fixed volume; said inner member having a first series of graduated openings adapted to register with the orifice for admission of odorous atmosphere, a second series of graduated openings adapted to register with the orifice for admission of odorless diluent atmosphere and a third series of openings adapted to register with the withdrawal orifice; and means for relatively rotating the shell and inner member to selected positions of said openings in registry with said orifices, and means on said device for indicating the dilution ratios of said mixed atmospheres.

9. A device as set forth in claim 8 in which the openings of the third series are of uniform area, the openings of a set in the first series are the same in area as the openings in the second series but vary in number from set to set and the sum of the areas of the openings in every set of series 1 and 2 exceeds the area of the openings in series 3.

10. A device as set forth in claim 9 in which the number of openings in said second series varies according to the formula $n=1+2x$ where $x$ includes even whole numbers from 0 to the highest desired dilution.

11. A device as set forth in claim 8 having means mounted in said mixing chamber to reduce the volume thereof to make it less than an average normal human inhalation.

12. A device as set forth in claim 8 in which said shell has an index mark and said end wall secured to said inner member has a series of scale marks which when aligned with said index mark give directly the dilution ratio of the blended atmospheres.

13. A device for the quantitative evaluation of the amount of odor in an odorous atmosphere comprising interfitting parts which are movable with respect to each other and which form a mixing chamber; means forming an outlet, an odorless atmosphere inlet and an odorous atmosphere inlet for said chamber; means for varying the ratio of the areas of said inlets by relative movement of said interfitting parts; at least one of said interfitting parts comprising porous metal having an adherent odorless lubricating coating comprising graphite and molybdenum which fills the pores of said porous metal, makes it non-adsorbing for odors in said odorous atmosphere and provides a practically air-tight, freely-slidable joint between said parts.

14. A device as set forth in claim 13 in which said porous metal is aluminum having an electrically anodized surface upon which said lubricating coating adheres.

15. A device for the quantitative evaluation of the amount of odor in an odorous atmosphere comprising a pair of interfitting aluminum members having cylindrical surfaces which are relatively movable with close tolerance forming mixing chamber of fixed volume having an inlet for odorous atmosphere including an inlet tube, an inlet for odorless atmosphere, an outlet for the blended atmospheres including a nosepiece and means for varying the relative areas of said inlet openings, by rotation of said members, said relatively movable surfaces having an adherent odorless lubricating coating comprising graphite and molybdenum.

References Cited in the file of this patent

UNITED STATES PATENTS

| | | |
|---|---|---|
| 2,136,844 | Fair et al. | Nov. 15, 1938 |
| 2,156,803 | Cooper | May 2, 1939 |
| 2,280,886 | Brace | Apr. 28, 1942 |
| 2,327,060 | Pollak et al. | Aug. 17, 1943 |